United States Patent [19]

Iwasaki et al.

[11] 4,423,091

[45] Dec. 27, 1983

[54] METHOD OF MAKING MICROCAPSULES

[75] Inventors: Hiroshi Iwasaki; Shinsuke Irii; Haruo Omura, all of Hyogo, Japan

[73] Assignee: Kanzaki Paper Manufacturing Co., Ltd., Tokyo, Japan

[21] Appl. No.: 328,175

[22] Filed: Dec. 7, 1981

[30] Foreign Application Priority Data

Dec. 13, 1980 [JP]  Japan ................................ 55-176297

[51] Int. Cl.³ .......................... B05D 7/24; B01J 13/02
[52] U.S. Cl. .............................. 427/213.34; 264/4.7; 282/27.5; 428/320.6; 428/402.21; 428/402.24
[58] Field of Search ..................... 252/316; 428/320.6; 264/4.7; 427/213.34

[56] References Cited

U.S. PATENT DOCUMENTS

| | | | |
|---|---|---|---|
| 3,607,775 | 9/1971 | Yoshida et al. | 252/316 |
| 4,087,376 | 5/1978 | Foris et al. | 252/316 |
| 4,093,556 | 6/1978 | Wojciak | 252/316 |
| 4,269,729 | 5/1981 | Maruyama et al. | 252/316 |

FOREIGN PATENT DOCUMENTS 2018711 10/1979 United Kingdom ............. 428/320.6

*Primary Examiner*—Richard D. Lovering
*Attorney, Agent, or Firm*—Morgan, Finnegan, Pine, Foley & Lee

[57] ABSTRACT

The method of making microcapsules comprises performing polycondensation for producing aminoaldehyde resin in an aqueous dispersion including particles of hydrophobic core material in the presence of cation-modified polyvinyl alcohol to form aminoaldehyde resin microcapsules walls around said particles of hydrophobic core material.

6 Claims, No Drawings

METHOD OF MAKING MICROCAPSULES

BACKGROUND OF THE INVENTION

This invention relates to a method of making microcapsules containing hydrophobic capsule core material and more particularly to a method of making microcapsules having an improved capsule core material retainability.

Microcapsules find their usefulness in various fields such as pressure-sensitive copying papers, heat-sensitive recording papers, adhesives, fertilizers, pharmaceuticals, foods, cosmetics, etc. There are known various method for making microcapsules useful for those purposes. Among them, there are included the "coacervation" method, the "interfacial polycondensation" method and the "in situ polymerization" method. It is also known that microcapsules each having a capsule wall of an aminoaldehyde resin are superior in the water resistance and the solvent resistance. For example, U.S. Pat. No. 3,016,308 discloses a method of making microcapsules in which urea-formaldehyde polycondensation resin capsule walls are formed in the presence of carboxymethyl cellulose. U.S. Pat. No. 3,516,941 discloses another method of making microcapsules in which urea-formaldehyde polycondensation resin capsule walls are formed in a suspension substantially containing no wetting agent. In these conventional methods of making microcapsules utilizing urea-formaldehyde resin, however, the system for making microcapsules must be carefully controlled as by stepwise and continual dilution since effective deposition of the polycondensation product on the capsule core material cannot be excpected. In order to effectively carry out deposition of the polymerized resin on the capsule core material, some attempts have been made. For example, Japanese Patent Publication No. 12,380 and 1962 proposes to utilize as a dispersing agent a substance having an active radical which is capable of causing chemical or physicochemical bond and each of Japanese Patent Publication No. 12,518 of 1963, 4,717 of 1973 and 13,456 of 1974 discloses to utilize phase separation by an electrostatic interaction. In these improved methods, however, the steps for making microcapsules are complicated as well as in the so-called "complex coacervation" method. Those methods also involve a disadvantage that the capsule walls are often cracked in the step of drying. This may be considered due to the fact that the microcapsule walls contain water soluble components having opposite net electrical charges.

Japanese Laid-Open Patent Publication No. 92,135 of 1980 (Japanese patent application No. 165,311 of 1978 filed Dec. 29, 1978) discloses a method for making microcapsules by covering the surface of hydrophobic core materials with an aminoaldehyde polycondensation resinous wall in the presence of an anionic modified polyvinylalcohol. According to this method deposition of an aminoaldehyde polycondensation resin on the surface of a capsule core material can be effectively carried out.

The principal object of the invention is to provide another novel and improved method for making microcapsules each having a capsule wall of an aminoaldehyde resin in which deposition of an aminoaldehyde polycondensation resin on the surface of a capsule core material can be effectively carried out without utilizing anion-modified polyvinyl alcohol.

Another object of the invention is to provide a novel and improved method for making microcapsules having sufficient moisture resistance and sufficient heat resistance.

A further object of the invention is to provide an improved method for making microcapsules which are especially useful for the production of pressure sensitive copying paper.

The other objects and advantages of the invention will become apparent from the following detailed description.

SUMMARY OF THE INVENTION

According to the invention the method of making microcapsules comprises performing polycondensation for producing aminoaldehyde resin in an aqueous dispersion including particles of hydrophobic core material in the presence of cation-modified polyvinyl alcohol to form aminoaldehyde resin microcapsule walls around said particles of hydrophobic core material.

DETAILED DESCRIPTION OF THE INVENTION

According to the invention, the microcapsules have a capsule wall of an aminoaldehyde resin obtained by polycondensation. Such the microcapsules can be produced by performing the polycondensation to form an aminoaldehyde resin in the presence of cation-modified polyvinyl alcohol in an aqueous dispersion including hydrophobic capsule core material particles dispersed therein. The hydrophobic capsule core material may be either of the liquid phase or of the solid phase. Among typically useful capsule core materials, there may be included: water-insoluble or substantially water-insoluble liquids such as animal oils, e.g. fish oil, and lard oil, vegetable oils, e.g. olive oil, peanut oil, linseed oil, soybean oil, and castor oil, mineral oils, e.g., petroleum, kerosene, xylene and toluene, and synthetic oils, e.g., alkylated diphenylalkane, alkylated naphthalene, diphenylethane, alkylated biphenyl, hydrogenated biphenyl, hydrogenated terphenyl, benzoic acid ester, salicylic acid ester and phthalic acid ester, water-insoluble metal oxides and salts; fibrous materials, e.g., cellulose and asbestos; water insoluble synthetic polymers; minerals; pigments; glasses; perfumes; flavourings; germicidal compositions; physiological compounds and fertilizers.

For pressure sensitive copying paper the above-mentioned oils as capsule core materials may include at least one colorless chromogenic material dissolved therein. Any of various known colorless chromogenic materials may be used for this purpose. Among them there are included, by way of examples, 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis(2-phenylindole-3-yl)-5-dimethylaminophthalide, 3-p-dimethylaminophenyl-3-(1-methylpyrrole-2-yl)-6-dimethylaminophthalide, 4,4'-bis-dimethylaminobenzhydrinebenzylether, N-halophenyl-leucoauramine, N-2,4,5-trichlorophenyl-leucoauramine, rhodamine-B-anilinolactam, rhodamine-(p-nitroanilino)lactam, rhodamine-(p-chloroanilino)lactam, 7-dimethylamino-2-methoxyfluoran, 7-diethylamino-2-methoxyfluoran, 7-diethylamino- 3-methoxyfluoran, 7-diethylamino-3-chlorofluoran, 7-diethylamino-3-chloro-2-methylfluoran, 7-diethylamino-2,3-dimethylfluoran, 7-diethylamino-(3-acetylmethylamino)fluoran, 7-diethylamino-(3-methylamino)fluoran, 3,7-diethylaminofluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, 2-phenylamino-3-methyl-6-(N-ethyl-N-p-toluyl)amino-fluoran, benzoylleucomethyleneblue, p-nitrobenzyl-leucomethylene blue, 3-methylspiro-dinaphtopyran, 3-ethyl-spiro-dinaphthopyran, 3,3'-dichlorospiro-dinaphthopyran, 3-benzyl-spiro-dinaphthopyran, 3-methyl-naphtho-(3-methoxy-benzo)-spiropyran, and 3-propyl-spiro-dibenzopyran. The above colorless chromogenic materials may be used either solely or in combination.

The cation-modified polyvinyl alcohol used for the present invention is polyvinyl alcohol (hereinafter referred to merely as "PVA") having cationic radicals, e.g. nitrogen atom providing cationic property, introduced at its main and/or side chains. Cation-modification of PVA may be carried out by copolymerization, graft polymerization or polymer reactions. Among the useful and preferred techniques therefor are included:

(1) saponification of copolymers of vinyl esters of organic acids such as vinyl formate, vinyl acetate and vinyl propionate with cationic acrylate or methacrylate monomers, cationic vinyl ethers, cationic vinyl esters of organic acid, vinyl monomers including cationic radicals such as N,N-dialkylacrylamides, amino-substituted styrenes and vinyl monomers having a N-heterocyclic ring;

(2) partial saponification of polymers and copolymers of vinyl esters of organic acids including cationic radicals;

(3) addition of vinyl monomers including cationic radicals, such as N,N-dimethylacrylamide and N,N-diethylacrylamide, to the hydroxyl group of polyvinyl alcohol;

(4) polymer reactions of the hydroxyl group of polyvinyl alcohol with reagents such as organic halides having cationic radicals, epoxy compounds having cationic radicals, ethers having cationic radicals and aldehyde having cationic radicals to introduce cationic radicals to polyvinyl alcohol; and (5) treatment of copolymers of reactive monomers such as vinyl chloride with vinyl ester or solutions of such copolymers with amines such as ammonia to cause saponification and introduction of amino radical simultaneously.

The amount of cationic radicals introduced in the PVA may be within the range of 0.05 to 30 mol %, preferably, 0.2 to 10 mol %, of the total monomer units of PVA.

In order to obtain capsule walls having a greatly improved core material retainability it is preferred that the cation-modified PVA used in the invention has hydrophobic radicals. Introduction of hydrophobic radicals to PVA may be performed by any of introduction of hydrophobic monomer units during the production of cation-modified PVA, alkylation, such as methylation and ethylation, of active hydrogen of cation-modified PVA, and acetalization, such as formalization, acetoacetalization and butyralization of PVA. One of the most economically advantageous step for this purpose is to control saponification of polymers of vinyl esters of organic acids, said polymers having cationic radicals.

The amount of hydrophobic radicals to be introduced to PVA may vary at will within the range capable of keeping PVA water soluble according to the kind of the core material used. Preferably, however, the cation-modified PVA may have hydrophobic radicals at 0.1 to 20 mol %, most preferably, 0.2 to 10 mol % of the total monomer units. The hydrophobic radicals may be included in PVA either in the form of hydrophobic monomer units remained such as ethylene monomer units and propylene monomer units or in the form of hydrophobic radicals added, such as methyl, ethyl, formal, acetoacetal, butyral and acetyl.

The cation-modified PVA may be used in an amount of at least 0.1% by weight of the amount of the aqueous dispersion. The preferred amount of the cation-modified PVA for obtaining improved microcapsules in a simpler manner would be at least 0.5% by weight, most preferably at least 2% by weight of the amount of the aqueous dispersion. The upper limit of the amount of the cation-modified PVA depends on the viscosity of the system and the device used for making microcapsules but generally may be at largest 20% by weight of the aqueous dispersion.

According to the invention, an aminoaldehyde resin obtained by polycondensation is used as capsule wall forming material. The aminoaldehyde resin used for the invention may be a polymer or copolymer of at least one amine, such as urea, thiourea, alkyl urea, ethylene urea, acetoguanamine, benzoguanamine, melamine, guanidine, dicyandiamide, biuret and cyanamide and at least one aldehyde such as formaldehyde, acetaldehyde, paraformaldehyde, hexamethylenetetramine, butylaldehyde, crotonaldehyde, glyoxal, glutaraldehyde, benzaldehyde and furfural.

The aminoaldehyde resin may be produced either by direct polycondensation of the above mentioned monomers or by first preparing a water soluble aminoaldehyde resin prepolymer of the above mentioned monomers and then performing polycondensation of said prepolymer. The utilization of the prepolymer is preferred because capsule walls having a uniform thickness and a good physical strength can be obtained. The prepolymer formed has at least one functional group represented by

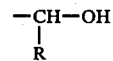

wherein R is a radical such that the aldehyde used may be represented by RCHO. Among the aminoaldehyde resin prepolymers those in which urea or melamine and formaldehyde are used as main starting materials are preferred because the capsule wall obtained from that prepolymer has a uniform thickness, a sufficient strength and an improved core material retainability.

The preparation of the above mentioned aminoaldehyde prepolymer is preferably carried out at an alkaline state, namely at a pH of at least 7, preferably within the range of 7 to 10.

The above mentioned reaction materials are introduced either in the form of monomers or in the form of a prepolymer or partly in the form monomers and partly in the form of a prepolymer to an aqeuous dispersion including the before-mentioned hydrophobic capsule core material particles dispersed therein to establish a system for making microcapsules. According to the invention polycondensation to form aminoaldehyde resin microcapsule walls is performed in the presence of cation-modified polyvinyl alcohol. Accordingly, the system for making microcapsules also include cation-modified polyvinyl alcohol.

The aminoaldehyde resin obtained according to the invention may also include any of other polycondensation components such as phenol, m-methoxyphenol, resorcin, pyrogallol, glycine and the like for changing the other properties of the capsule wall as desired. As a matter of course, the amount of each other polycondensation components included should be within such the range that the desirable effects according to the invention can be achieved and maintained. These other polycondensation components may be added to the system for performing polycondensation.

The polycondensation for forming an aminoaldehyde resin may preferably be performed in the above mentioned aqueous dispersion in an acidic state, preferably, at pH of 2 to 6. In order to adjust the system for the production of microcapsules in such an acidic state like this any of known acid catalysts such as formic acid, acetic acid, citric acid, oxalic acid, paratoluenesulphonic acid, hydrochloric acid, sulfuric acid, nitric acid, phosphoric acid, ammonium chloride and ammonium sulfate may be used.

In order to accelerate the polycondensation of the system for the production of microcapsules may be heated at a temperature between the range of 20° to 100° C., most preferably, within the range of 35° to 70° C. In this manner microcapsules having stable properties can be produced for relatively short time.

The system for the production of microcapsules may also include any conventional protective colloidal materials and surfactants. It is a matter of course that the amount of such protective colloidal material and/or surfactants should be within such a range that the effects which the invention aims may not be prevented.

According to the invention the polymerized resin is effectively deposited on each of the capsule core material particles. This can be achieved by merely admixing various materials for forming microcapsules and providing proper conditions for polycondensation. Careful control of the system as required in the conventional method, for example, as stepwise and continuous dilution, is not needed. The obtained microcapsule walls has a good moisture resistance and a good heat resistance. In addition, when colorless chromogenic material is used as the capsule core material, the coloring of the capsule dispersion which has been inevitable in the conventional technique can be unexpectedly effectively prevented. Thus the microcapsules made by according to the invention especially finds its usefulness in the production of pressure sensitive copying paper.

The theory and mechanism why the good result is obtained according to the invention are not clear. However, it may be assumed that the presence of cation-modified PVA would provide the microcapsule making system with a certain desirable condition especially for the polycondensation for forming an aminoaldehyde resin to effectively deposit the polycondensation product on the surface of capsule core material.

DETAILED DESCRIPTION OF THE PREFERRED EMBODIMENT

The following examples serve to illustrate the invention in more detail especially in connection with production of pressure sensitive copying paper, although the invention is not limited to the examples. Unless otherwise indicated, parts and % signify parts by weight and % by weight, respectively.

EXAMPLE 1

19 parts of vinyl acetate, 1 part of N,N-dimethylacrylamide and 0.02 parts of $\alpha,\alpha'$-azobisisobutyronitrile were dissolved in 10 parts of benzene and polymerized under a nitrogen atmosphere at 60° C. for 24 hours. The resultant solution was added to an excess amount of petroleum ether to precipitate a copolymer. The copolymer was saponified in methyl alcohol with sodium hydroxide and then separated from the medium. After drying a cation-modified PVA in which saponification degree was 99.9 mol % and cationic radical content was 2.2 mol % was obtained.

3 parts of urea and 0.3 parts of resorcin were added to 100 parts of 3.5% aqueous solution of the cation-modified PVA. Then the pH of the system was adjusted to 3.3 to produce an aqueous medium for preparing microcapsules.

On the other hand, 2.8 parts of crystal violet lactone and 0.7 parts of benzoyl leucomethylene blue were dissolved in 100 parts of alkyl naphthalene (KMC Oil manufactured by Kureha Kagaku Kogyo Kabushiki Kaisha, Japan) to prepare an oily solution. 35 parts of the oily solution was dispersed in the above medium for preparing microcapsules to obtain an emulsion containing oily capsule core material particles which have an average particle size of 3.5 microns. Further, 7.5 parts of 37% aqueous solution of formaldehyde was added to the emulsion and then the mixture was maintained at 70° C. for 3 hours with slow stirring to produce a microcapsule dispersion.

EXAMPLE 2

10 parts of PVA in which polymerization degree was 1700 and saponification degree was 98 mol % was dissolved in 90 parts of deionized water and then 9.1 parts of 10% aqueous solution of sodium hydroxide was added to the solution. Subsequently, 17 parts of N,N-dimethylacrylamide was added with stirring and made to react with the PVA at 70° C. for 3.5 hours. Upon recrystallization from methanol a cation-modified PVA in which cationic radical content was 6.7 mol % was obtained. 100 parts of 5% aqueous solution of the cation-modified PVA was adjusted to pH 2.8 to prepare an aqueous medium for preparing microcapsules. The same oily capsule core material as in Example 1 was dispersed in the above medium to obtain an emulsion containing the core material particles which have an average particle size of 4 microns. Further, there was added to the emulsion an aqueous solution of urea-formaldehyde resin prepolymer produced by adding 3 parts of urea to 7.5 parts of 37% aqueous solution of formaldehyde at pH 8.0 and heating the mixture at 70° C. for one hour, and then 0.3 parts of resorcin was added to the emulsion. The emulsion system was maintained at 65° C. for 3 hours to prepare a microcapsule dispersion.

EXAMPLE 3

A cation-modified PVA having a cationic radical content of 11.2 mol % was obtained by the same manner as in Example 2 except that a partially saponified PVA with saponification degree of 88 mol % and polymerization degree of 1700 was used and the reaction was carried out at 60° C. for 2.5 hours. A microcapsule dispersion was prepared with the use of the above cation-modified PVA in the same manner as in Example 2.

EXAMPLE 4

A cation-modified PVA having a cationic radical content of 7.3 mol % was obtained by the same manner as in Example 2 except that 10.8 parts of ethylene-vinyl alcohol copolymer in which 7.4 mol % of ethylene was contained, saponification degree was 99.4 mol % and polymerization degree was 1500 was used instead of 10 parts of PVA. A microcapsule dispersion was prepared with the use of the above cation-modified PVA in the same manner as in Example 2.

CONTROL 1

Example 1 was repeated except that a commercial non-modified PVA (Kuraray PVA 217 with saponification degree of 88 mol % manufactured by Kuraray Co., Ltd., Japan) was used instead of the cation-modified PVA. The resultant capsule did not have a sufficient wall strength.

CONTROL 2

Example 2 was repeated except that PVA before cation-modifying was used instead of the cation-modified PVA to prepare a microcapsule dispersion.

CONTROL 3

Example 2 was repeated except that ethylene-vinyl alcohol copolymer used in Example 4 was used instead of the cation-modified PVA to prepare a microcapsule dispersion.

Each of the microcapsule dispersions produced in Examples and Controls was cooled on standing and then mixed with 10 parts of cellulose powder and 50 parts of 20% aqueous solution of oxidized starch to prepare a capsule coating composition. The coating composition was coated on one surface of a paper sheet of 40 g/m$^2$ in an amount of 4 g/m$^2$ on dry basis and dried to produce a capsule coated paper sheet.

The properties of the thus obtained capsule coated paper sheet were examined with the following manners.

At first, an acceptor coated sheet was prepared by the steps of admixing 65 parts of aluminum hydroxide, 20 parts of zinc oxide, 15 parts of a co-melt of zinc-3,5-di($\alpha$-methylbenzyl)-salicylate and $\alpha$-methylstyrene-styrene copolymer in which the co-melting ratio was 80/20 and an aqueous solution containing 5 parts of polyvinyl alcohol to 300 parts of water, finely dividing the mixture for 24 hours in a ball-mill to obtain a dispersion, adding to the dispersion a latex of carboxylated styrene-butadiene copolymer in which the solid amount was 20 parts to prepare an acceptor coating composition, coating the thus prepared composition on one surface of a base paper sheet of 40 g/m$^2$ in an amount of 5 g/m$^2$ on dry basis and drying the coated paper sheet.

1. Stability of Color Forming

Each capsule coated sheet obtained in Examples and Controls was treated by standing under the following conditions:

(a) heat resistance: at 115° C. for 3 hours.
(b) solvent resistance: under an atmosphere saturated with trichloroethylene for one hour.
(c) humidity resistance: at 50° C., 90% RH for one day.

The treated sheet was put on the above acceptor coated sheet so that the coated layers were close to each other to provide samples. The samples were pressed with 100 Kg/cm$^2$ for one minute to form a color image. The color density of the image on the acceptor coated surface was measured by a spectrophotometer at 600 nm reflection ratio with the use of magnesium oxide as a standard. The results are shown in Table 1 in terms of the color density decreasing ratios with the following ranks on the basis of the color density of images formed with the untreated capsule coated sheeet.

A: from 0% to less than 5%
B: from 5% to less than 10%
C: from 10% to less than 20%
D: from 20% to less than 50%
E: above 50%

2. Physical Strength (Smudging)

Each of the capsule coated paper sheets was put on the acceptor coated sheet so that the coated layers were closed to each other to provide samples. A pressure of 5 Kg/cm$^2$ was applied on the samples and they were allowed to stand in an oven at 115° C. for 3 hours. Then the smudging degree of acceptor coated paper sheets was examined. The results were valued with the following equation. They are shown in Table 1.

$$(X \times 100)/Y(\%)$$

X: Reflection ratio on the acceptor coated layer after the above treatment.
Y: Reflection ratio on the acceptor coated layer before the above treatment.
The reflection ratio was measured in the same manner as in the above stability test.

TABLE 1

| | Heat Resistance | Solvent Resistance | Humidity Resistance | Smudging (%) |
|---|---|---|---|---|
| Example 1 | A | B | B | 95 |
| Example 2 | A | A | A | 100 |
| Example 3 | A | A | B | 91 |
| Example 4 | A | A | A | 100 |
| Control 1* | — | — | — | — |
| Control 2 | B | C | C | 61 |
| Control 3 | D | E | C | 38 |

*When the coating composition was applied on a base sheet and dried, the capsule core material flew out so that any useful capsule coated paper sheet for pressure-sensitive copying system was not prepared.

We claim:

1. A method of making microcapsules comprising performing polycondensation for producing aminoaldehyde resin in an aqueous dispersion including particles of hydrophobic core material in the presence of cation-modified polyvinyl alcohol to form aminoaldehyde resin microcapsule walls around said particles of hydrophobic core material, said cation-modified polyvinyl alcohol present in an amount of 0.1 to 20% by weight of said aqueous dispersion and in the form of an aqueous solution.

2. A method of making microcapsules according to claim 1 in which said cation-modified polyvinyl alcohol has cationic radicals at 0.05 to 30 mol. % of its total monomer units.

3. A method of making microcapsules according to claim 2 in which said cation-modified polyvinyl alcohol has cationic radicals at 0.2 to 10 mol. % of its total monomer units.

4. A method of making microcapsules according to claim 1 in which said cation-modified polyvinyl alcohol has hydrophobic radicals at 0.2 to 10 mol. % of its total monomer units.

5. A method of making microcapsules according to claim 1 in which aminoaldehyde resin is produced by polycondensation of at least one amine and at least one aldehyde.

6. A method of making microcapsules according to claim 1 in which aminoaldehyde resin is produced by the steps of preparing an aldehyde resin prepolymer of at least one amine and at least one aldehyde and performing polycondensation of said aminoaldehyde resin prepolymer.

* * * * *